July 4, 1944.   F. J. PARSONS   2,352,969
INTERNAL EXPANDING FRICTION CLUTCH
Filed Oct. 3, 1941
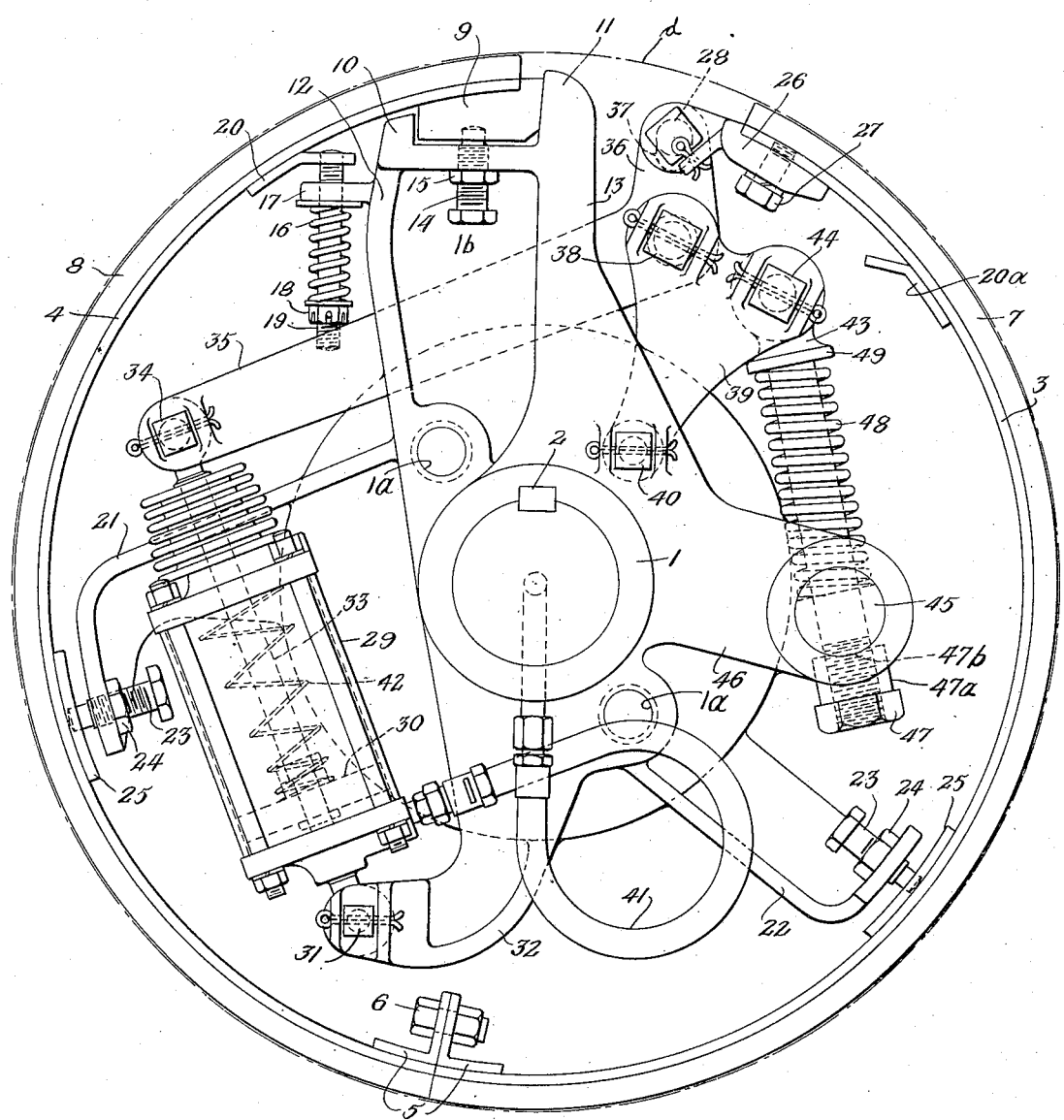
INVENTOR
Forrest J. Parsons
BY
ATTORNEYS Patented July 4, 1944

2,352,969

UNITED STATES PATENT OFFICE 2,352,969

INTERNAL EXPANDING FRICTION CLUTCH

Forrest J. Parsons, Lima, Ohio

Application October 3, 1941, Serial No. 413,402

16 Claims. (Cl. 192—85)

This invention relates to internal expanding friction clutches, and is particularly concerned with the mechanism for operating the clutch and with novel means of adjustment to compensate for wear.

Although most features of the invention are of general application in the field of internal expanding clutches, the arrangement herein disclosed is particularly well adapted to clutches of relatively heavy machinery, such as cranes, draglines, power shovels, and other excavating equipment. Clutches are used in equipment of this sort for a variety of purposes including transmission of power from one shaft to another or from a shaft to a cable drum, for various functions such as boom hoisting, crowding, etc. Because of the power required to be carried through the clutch for these purposes, the clutch drum and the cooperating internal expanding clutch assembly are of relatively large diameter, in view of which maintenance of proper clutch operating conditions requires adjustments of appreciable magnitude to compensate for wear of the friction band.

Various operating and adjustment mechanisms have been employed heretofore, but have been subject to a number of disadvantages and difficulties, such as complication of adjustment to compensate for wear and inaccuracy of clutch engagement, particularly when adjustments are made to compensate for wear. The present invention is primarily concerned with overcoming disadvantages and difficulties of this type.

More specifically, the present invention contemplates an operating mechanism providing for transmission of the clutch engaging force to the live end of the clutch band in a direction substantially circumferentially of the band, the clutch band and the operating mechanism being arranged in a manner to permit freedom for relative radial movement of the band and thereby ensure accurate and most effective engagement.

It is a further object of this invention to maintain the foregoing desirable conditions while at the same time providing for adjustment of the parts to compensate for wear, so that the direction of application of the clutch engaging force and the desirable accuracy of clutch engagement are retained even in widely differing positions of adjustment of the wear compensating means.

The preferred embodiment of clutch assembly is illustrated in the accompanying drawing, in which the figure is a side elevational view.

As seen in the drawing, the assembly, including the friction band, is carried by a support or spider having a central apertured hub 1 adapted to be mounted on a driven shaft, the spider being keyed to the shaft, as by a key 2. It will be understood that a clutch drum, indicated in dot and dash outline at d, is arranged coaxially of the shaft, with the inner drum surface surrounding the internal clutch parts carried by the spider, power being transmitted through the clutch from the shaft to the drum. Diametrically opposite threaded holes 1a are provided in the spider to cooperate with puller rods for removing the assembly from the central shaft.

As illustrated, the clutch band is of split construction, comprising two parts 3, 4 which are joined together by means of splice angles 5 interconnected by one or more bolts 6. The friction lining is also formed in two parts 7, 8, carried respectively by the bands 3, 4, for which purpose rivets or the like may be used.

A block or end piece 9 is secured to the dead end of the clutch band, this block being received in a socket formed between abutments 10 and 11 which are connected with the hub 1 of the spider by a web 1b and ribs 12 and 13. Set screw 14 with a locking nut 15 determines the extent of release of the dead end of the clutch band, as effected under the influence of spring 16. This spring reacts between abutment lug 17 and the adjustable nut 18, which latter is carried by screw 19 having a sliding fit in an aperture in the abutment lug 17 and being connected with clutch band 4 through a bracket 20. The spring thus draws the dead end of the clutch band inwardly, for release at that end.

A pair of arms 21 and 22 radiating from the spider hub serve to carry adjustable screws 23, each provided with a lock nut 24, for limiting the inward or release movement of the clutch band at spaced points intermediate the ends of the band. The outer ends of the screws engage between guides 25 to prevent undesired displacement of the clutch band in the axial direction.

At this point it may be mentioned that the segments 3, 4 of the clutch band are counterparts, so that the entire band may be inverted to bring the dead end into the live end position and vice versa. Upon such inversion from the position shown, the bracket 20a of segment 3 will be positioned to cooperate with screw 19 of the device for releasing the dead end. This inversion is of advantage since, as is well recognized, the dead end of the band normally wears at a more rapid rate than the live end, in view of which inversion may be employed to equalize the wear and to extend the useful life of the friction material. In making such an inversion the fittings, such as block 9 at the dead end and the end piece 26 at the live end will, of course, be secured to the opposite ends of the band.

The live end piece 26 is secured to the band by bolts 27 and carries a pin 28 located generally at the end of the band, this pin serving as the element through which the clutch applying force is delivered to the band. In this connection it may be noted that the most effective engagement of the clutch is secured by transmission of a force to the band substantially tangentially at the live end. Pin 28, being located very close to the plane of the live end, is highly effective for this purpose.

The clutch engaging force is derived from a fluid pressure cylinder and piston device 29, 30, the cylinder being pivotally mounted at 31 on an arm 32 formed as a part of the supporting spider. The piston rod 33 projects from the end of the cylinder and has a pivot joint 34 with one end of the operating lever 35. Operating lever 35 is generally of bell crank form, having a short arm 36 with a slot 37 therein engaging pin 28. The bell crank is pivoted at 38 to a rocker member 39, which latter is pivotally connected to the supporting spider at 40.

With the rocker member 39 retained in a fixed position, it will be seen that introduction of pressure fluid to cylinder 29 through connection 41 will cause piston 30 to move upwardly and thereby transmit a force through the operating lever in a direction tending to expand the clutch. Downward movement of piston 30 in cylinder 29 under the influence of release spring 42 will effect positive release of the clutch band because of the engagement of pin 28 in slot 37. While any suitable fluid pressure or vacuum control system may be used for operation of an appropriate piston and cylinder device for applying and releasing the clutch, in the arrangement shown, the supply and exhaust take place through connection 41, which is extended into the hub 1 of the spider for communication with an appropriate fluid passage in the power shaft in a manner which need not be considered herein.

It may here be noted that while I have illustrated a fluid pressure device for delivering a clutch engaging force to the operating lever, which is a preferred arrangement, certain features of the invention brought out more fully hereinafter are equally applicable where the clutch engaging force is secured mechanically or in some other way.

By virtue of the arrangement of the operating lever, with its arm 36, and with the pin and slot connection 28—37, highly effective clutch engagement is secured, not only because the clutch engaging force is transmitted to the band substantially endwise at the live end, but also because the band is free to adjust itself radially at the live end into accurate contact with the surrounding clutch drum. Moreover, as will be seen hereinafter, these conditions are maintained notwithstanding the adjustments which may be made from time to time to compensate for wear of the friction material.

The wear adjustment mechanism includes a bolt 43, pivoted at 44 to the rocker member 39, and extended therefrom through an aperture in the fulcrum pin 45 which is arranged for rotative movement in arm 46 of the supporting spider. Beyond the fulcrum pin 45 the bolt carries an adjustment nut 47 having a shank 47a which is indented at 47b to fit the periphery of pin 45 and thereby retain the desired adjustment. Engagement of the nut 47 with pin 45 is maintained under the influence of spring 48 which reacts between the pin and a shoulder 49 formed on the bolt.

As the operating lever 35 is moved upwardly to engage the clutch, the reaction of that movement is carried through rocker member 39 and thence in tension through bolt 43 to fulcrum pin 45, spring 48 serving only to retain the bolt in normal position during and after release.

Compensation for wear is a very simple operation (primarily involving adjustment of nut 47), which is of considerable importance because of the difficulty of access in many installations.

Adjustment of nut 47 effects movement of rocker member 39 about pivot 40, this movement in turn causing pivot 38 for the operating lever to move in an arc about rocker pivot 40. Since pivot 40 is located relatively close to the axis of the clutch assembly, and since both of pivots 38 and 40 lie close to a radial plane containing the axis of the assembly, the adjustment movement of pivot center 38, in general, takes place circumferentially of the clutch band, which is in contrast with certain prior arrangements in which adjustment to compensate for wear resulted in considerable radial movement of various of the parts. In consequence of the generally circumferential movement, the desired action in the operation of lever 35 and arm 36 is maintained, notwithstanding adjustment to compensate for wear.

When an appreciable degree of wear has developed, the adjustment screw 14 at the dead end of the band and the screws 23 intermediate the ends of the band are advanced appropriately so as to define new positions of release. The new position of release at the live end is determined by the adjustment of nut 47, the pin and slot connection 28—37 serving to exert a positive releasing action on the live end of the band when the operating lever 35 is moved to release position.

With further reference to the adjustment for wear, it is mentioned that although the movement of pivot 38 (carried by rocker 39) takes place generally circumferentially of the band, the rocker pivot 40 is so located that with new friction material 7, 8, pivot center 38 lies a little to one side (to the left as viewed in the drawing) of the radial plane containing the axis of the assembly and the axis of rocker pivot 40. Because of this relative location of parts and pivot axes, the generally circumferential movement of pivot center 38 includes a minor component of movement radially outwardly, with the result that the operating lever still delivers the clutch applying force to the band substantially in the plane of the live end, notwithstanding adjustment to take up wear. Moments tending to bend the live end of the band are thereby reduced.

Another advantage of the radial component of adjustment movement mentioned above is that the slot and pin connection 28—37 establishes a new release position for the live end of the band each time the adjustment nut 47 is drawn up, to compensate for wear of the friction material 7, 8. The arrangement of the operating lever and adjustment mechanism therefor thus cooperates with the adjustment devices 14 and 23—23 in providing proper release position throughout the entire periphery of the band.

I claim:

1. A friction clutch assembly comprising, in combination with a clutch band, an arm mounted by a pivot and adapted to engage and transmit a clutch engaging force to said band, and means for adjustably shifting the pivot of said arm in a direction generally circumferentially of the band, including a rocker member carrying the mounting pivot for said arm, and pivotal mounting means for the rocker member providing a rocker pivot axis close to the axis of the clutch assembly.

2. A construction in accordance with claim 1 in which the pivot axes of said arm and rocker member are located, respectively, close to the clutch band and close to the axis of the clutch assembly, and both said pivot axes lie adjacent a radial plane containing the axis of the clutch assembly.

3. A construction in accordance with claim 1, having adjustable means for holding the rocker member in different positions of adjustment about the axis of its mounting means.

4. A construction in accordance with claim 1 and further including a slot and pin connection between said arm and the clutch band arranged to transmit clutch engaging force to the band with freedom for relative movement of the arm and band in a direction generally radially of the clutch assembly whereby to accommodate adjustments of the rocker member as well as operating movements of the arm.

5. An internal expanding friction clutch assembly including in combination with a clutch band, mechanism for engaging the clutch including an operating lever of bell crank form one arm of which is adapted to engage an end of the clutch band to transmit a clutch engaging force thereto and another arm of which is adapted to cooperate with clutch actuating means, a pivot mounting providing a pivotal axis about which said bell crank lever moves upon engagement of the clutch, a rocker support for said pivot mounting arranged for adjustment of the position of said pivot axis, and adjustable means for holding the rocker support in different positions of adjustment.

6. An internal expanding friction clutch assembly including a clutch support adapted to be mounted on a shaft, a clutch band mounted on the support, and mechanism for engaging the clutch including a fluid pressure piston and cylinder device one part of which is pivotally connected with the clutch support, an operating lever pivotally connected with the other part of said device, a rocker member for supporting the operating lever, means pivotally connecting the rocker member to the clutch support, means pivotally connecting the operating lever to the rocker member, adjustable means for holding the rocker member in different positions, and an arm connected with the operating lever and extended for engagement with one end of the clutch band to transmit a clutch engaging force thereto, the pivotal connections being so disposed that the fluid pressure device can move to different positions to accommodate different adjusted positions of said rocker member.

7. A construction in accordance with claim 6 in which the axes of the pivots connecting the rocker member to the clutch support and connecting the operating lever to the rocker member are located, respectively, close to the axis of the clutch assembly and close to the clutch band, and both said pivot axes lying adjacent a radial plane containing the axis of the clutch assembly.

8. A construction in accordance with claim 6 in which the adjustable means for holding the rocker member in different positions comprises a bolt one end of which is pivoted to the rocker member, a pin pivotally carried by the clutch support and cooperating with the other end of said bolt, and means for altering the effective length of the bolt connection between said pin and said rocker member.

9. An internal expanding friction clutch including in combination with a clutch band, a support, a movable clutch applying member having a point of reaction on said support and adapted to engage and transmit an expanding force to said band in a direction generally circumferentially thereof, means for adjustably shifting the point of reaction of said member on the support in a direction generally circumferentially of the band to compensate for wear of the clutch, means providing for relative radial shifting between said member and the band, and yielding means for maintaining the adjusted position of said reaction point when the clutch is released.

10. An internal expanding friction clutch including in combination with a clutch band, a support, a movable clutch applying member having a point of reaction on said support and adapted to engage and transmit an expanding force to said band in a direction generally circumferentially thereof, means for adjustably shifting the point of reaction of said member on the support in a direction generally circumferentially of the band to compensate for wear of the clutch, and means providing for relative radial shifting between said member and the band, said adjustable means including a self-locking, readily accessible adjusting element.

11. An internal expanding friction clutch assembly including in combination with a clutch band, an arm adapted to engage and transmit a clutch engaging force to said band, a pivot for said arm, control means for actuating said arm, a rocker member on which said arm is mounted by said pivot, means mounting the rocker member for movement in a direction such that the axis of pivoting of the arm may be adjusted in a direction generally circumferentially of the band, adjustable means for holding the rocker member in different positions including a pin pivotally movable about an axis fixed with reference to the axis of pivoting of the rocker member, and an adjustable bolt interconnecting the rocker member and said pin.

12. An internal expanding friction clutch assembly including in combination with a clutch band, an arm adapted to engage and transmit a clutch engaging force to said band, a pivot for said arm, control means for actuating said arm, a rocker member on which said arm is mounted by said pivot, means mounting the rocker member for movement in a direction such that the axis of pivoting of the arm may be adjusted in a direction generally circumferentially of the band, adjustable means for holding the rocker member in different positions including a fulcrum pin with its axis fixed with reference to the axis of pivoting of the rocker member, said pin being transversely apertured, a bolt pivotally connected to the rocker member and extending therefrom through the aperture in said pin, and an adjustment nut on said bolt cooperating with said pin.

13. A construction in accordance with claim 12 in which said adjustment nut is disposed at that side of said pin remote from the rocker member and in which a compression spring reacts between said bolt and the opposite side of said pin.

14. An internal expanding friction clutch assembly including a clutch support adapted to be mounted on a shaft, a clutch band mounted on the support, and mechanism for engaging the clutch including a fluid pressure piston and cylinder device, the piston being pivotally connected with the clutch support, a fluid pressure supply line connected with the cylinder at one end and adapted to receive controlling fluid through a shaft-passage at its other end, an operating lever pivotally connected with the piston, a rocker member for supporting the operating lever, means pivotally connecting the operating lever to the clutch support, means pivotally connecting the operating lever to the rocker member, adjustable means for holding the rocker member in different positions, and an arm connected with the operating lever and extended for engagement with one end of the clutch band to transmit a clutch engaging force thereto, the pivotal connections being so disposed that the fluid pressure device can move to different positions to accommodate different adjusted positions of said rocker member.

15. An internal expanding friction clutch assembly including in combination with a clutch band, an arm adapted to engage and transmit a clutch engaging force to said band, a mounting pivot for said arm, adjustable mechanism for compensating for wear of the clutch including a pivoted rocker member carrying the mounting pivot for said arm, the arm pivot axis being located relatively close to the clutch band and the rocker pivot axis being located intermediate the center of the clutch assembly and said arm pivot axis, and said arm and rocker pivot axes being so relatively located circumferentially of the band that adjustment of the position of the rocker member to take up wear carries the pivot center for the arm in a direction generally circumferentially of the band but slightly radially outwardly.

16. A friction clutch or like assembly comprising, in association with a clutch band, an operating lever, a fulcrum for said lever, means for transmitting a clutch engaging force from said lever to said band, and a pivoted member carrying said fulcrum for movement of the fulcrum to different positions.

FORREST J. PARSONS.